(12) United States Patent
Pettersson et al.

(10) Patent No.: US 8,162,220 B2
(45) Date of Patent: *Apr. 24, 2012

(54) PRODUCT PROVIDED WITH A CODING PATTERN AND APPARATUS AND METHOD FOR READING THE PATTERN

(75) Inventors: Mats Petter Pettersson, Lund (SE); Tomas Edso, Lund (SE)

(73) Assignee: Anoto AB, Lund (SE)

( * ) Notice: Subject to any disclaimer, the term of this patent is extended or adjusted under 35 U.S.C. 154(b) by 359 days.

This patent is subject to a terminal disclaimer.

(21) Appl. No.: 12/461,303

(22) Filed: Aug. 6, 2009

(65) Prior Publication Data

US 2010/0096458 A1    Apr. 22, 2010

Related U.S. Application Data

(60) Continuation of application No. 11/268,562, filed on Nov. 8, 2005, now Pat. No. 7,588,191, which is a continuation of application No. 10/714,894, filed on Nov. 18, 2003, now Pat. No. 7,281,668, which is a division of application No. 09/676,914, filed on Oct. 2, 2000, now Pat. No. 6,663,008.

(60) Provisional application No. 60/157,967, filed on Oct. 6, 1999.

(30) Foreign Application Priority Data

Oct. 1, 1999   (SE) ...................................... 9903541

(51) Int. Cl.
*G06K 7/08* (2006.01)
(52) U.S. Cl. ........................................................ 235/454
(58) Field of Classification Search ................... 235/454, 235/487, 494
See application file for complete search history.

(56) References Cited

U.S. PATENT DOCUMENTS 3,983,366 A    9/1976   Gunn
(Continued)

FOREIGN PATENT DOCUMENTS

EP        0 132 241 A2    1/1985
(Continued)

OTHER PUBLICATIONS

IBM Technical Disclosure Bulletin, "Coordinate Locator", vol. 18, No. 5., Oct. 1975 (2 pages).

(Continued)

*Primary Examiner* — Jamara Franklin
(74) *Attorney, Agent, or Firm* — Finnegan, Henderson, Farabow, Garrett & Dunner LLP

(57) ABSTRACT

A product and method for decoding information is provided. The product includes a sensor for detecting a plurality of marks on a surface to obtain associated mark location data, at least a first group of the plurality of marks being arranged on the surface so as to define an invisible raster with predetermined dimensions and marks in at least a second group of the plurality of marks are displaced from raster locations in a manner encoding information, and a processor for receiving from the sensor at least some of the mark location data, the processor determining, using the received mark location data, a position of the invisible raster on the surface, and decoding information based on positions of at least some of the marks in the second group of the plurality of marks relative to locations on the invisible raster.

42 Claims, 5 Drawing Sheets

U.S. PATENT DOCUMENTS

| | | | |
|---|---|---|---|
| 4,389,712 A | 6/1983 | Frattarola et al. |
| 4,494,862 A | 1/1985 | Tanaka |
| 4,495,646 A | 1/1985 | Gharachorloo |
| 4,581,482 A | 4/1986 | Rothfjell |
| 4,806,976 A | 2/1989 | Kato et al. |
| 4,835,544 A | 5/1989 | Winterburn |
| 4,874,936 A | 10/1989 | Chandler et al. |
| 4,887,128 A | 12/1989 | Jamali et al. |
| 4,939,354 A | 7/1990 | Priddy et al. |
| 4,969,013 A | 11/1990 | Tsilibes |
| 5,012,049 A | 4/1991 | Schier |
| 5,027,414 A | 6/1991 | Hilton |
| 5,051,736 A | 9/1991 | Bennett et al. |
| 5,063,600 A | 11/1991 | Norwood |
| 5,067,162 A | 11/1991 | Driscoll, Jr. et al. |
| 5,091,966 A | 2/1992 | Bloomberg et al. |
| 5,107,541 A | 4/1992 | Hilton |
| 5,128,525 A | 7/1992 | Stearns et al. |
| 5,128,526 A | 7/1992 | Yoshida |
| 5,168,147 A | 12/1992 | Bloomberg |
| 5,194,852 A | 3/1993 | More et al. |
| 5,208,449 A | 5/1993 | Eastman et al. |
| 5,221,833 A | 6/1993 | Hecht |
| 5,235,654 A | 8/1993 | Anderson et al. |
| 5,243,149 A | 9/1993 | Comerford et al. |
| 5,245,165 A | 9/1993 | Zhang |
| 5,303,312 A | 4/1994 | Comerford et al. |
| 5,315,098 A | 5/1994 | Tow |
| 5,329,107 A | 7/1994 | Priddy et al. |
| 5,342,671 A | 8/1994 | Stephenson |
| 5,343,031 A | 8/1994 | Yoshida |
| 5,394,487 A | 2/1995 | Burger et al. |
| 5,408,543 A | 4/1995 | Yoshida |
| 5,416,312 A | 5/1995 | Lamoure |
| 5,428,805 A | 6/1995 | Morgan |
| 5,436,974 A | 7/1995 | Kovanen |
| 5,442,147 A | 8/1995 | Burns et al. |
| 5,449,895 A | 9/1995 | Hecht et al. |
| 5,449,896 A | 9/1995 | Hecht et al. |
| 5,453,605 A | 9/1995 | Hecht et al. |
| 5,477,012 A | 12/1995 | Sekendur |
| 5,486,686 A | 1/1996 | Zdybel, Jr. et al. |
| 5,515,491 A | 5/1996 | Bates et al. |
| 5,537,223 A | 7/1996 | Curry |
| 5,572,010 A | 11/1996 | Petrie |
| 5,587,560 A | 12/1996 | Crooks et al. |
| 5,591,949 A | 1/1997 | Bernstein |
| 5,625,833 A | 4/1997 | Levine et al. |
| 5,629,499 A | 5/1997 | Flickinger et al. |
| 5,640,002 A | 6/1997 | Ruppert et al. |
| 5,652,412 A | 7/1997 | Lazzouni et al. |
| 5,661,506 A | 8/1997 | Lazzouni et al. |
| 5,692,073 A | 11/1997 | Cass |
| 5,706,099 A | 1/1998 | Curry |
| 5,710,420 A | 1/1998 | Martin et al. |
| 5,721,768 A | 2/1998 | Stimson et al. |
| 5,721,940 A | 2/1998 | Luther et al. |
| 5,752,152 A | 5/1998 | Gasper et al. |
| 5,784,485 A | 7/1998 | Xu et al. |
| 5,790,105 A | 8/1998 | Yoshikawa |
| 5,793,506 A | 8/1998 | Schmid |
| 5,815,142 A | 9/1998 | Allard et al. |
| 5,825,947 A | 10/1998 | Sasaki et al. |
| 5,842,196 A | 11/1998 | Agarwal et al. |
| 5,852,434 A | 12/1998 | Sekendur |
| 5,852,809 A | 12/1998 | Abel et al. |
| 5,864,127 A | 1/1999 | Jackson et al. |
| 5,869,819 A | 2/1999 | Knowles et al. |
| 5,890,177 A | 3/1999 | Moody et al. |
| 5,896,403 A | 4/1999 | Nagasaki et al. |
| 5,897,648 A | 4/1999 | Henderson |
| 5,905,251 A | 5/1999 | Russell et al. |
| 5,918,214 A | 6/1999 | Perkowski |
| 5,932,863 A | 8/1999 | Rathus et al. |
| 5,933,812 A | 8/1999 | Meyer et al. |
| 5,937,110 A | 8/1999 | Petrie et al. |
| 5,939,703 A | 8/1999 | Hecht et al. |
| 5,950,173 A | 9/1999 | Perkowski |
| 5,969,712 A | 10/1999 | Morita et al. |
| 5,983,277 A | 11/1999 | Heile et al. |
| 6,000,613 A | 12/1999 | Hecht et al. |
| 6,041,335 A | 3/2000 | Merritt et al. |
| 6,050,490 A | 4/2000 | Leichner et al. |
| 6,072,917 A | 6/2000 | Mori et al. |
| 6,076,734 A | 6/2000 | Dougherty et al. |
| 6,076,738 A | 6/2000 | Bloomberg et al. |
| 6,078,806 A | 6/2000 | Heinonen et al. |
| 6,081,261 A | 6/2000 | Wolff et al. |
| 6,101,483 A | 8/2000 | Petrovich et al. |
| 6,176,425 B1 | 1/2001 | Harrison et al. |
| 6,186,405 B1 | 2/2001 | Yoshioka |
| 6,192,380 B1 | 2/2001 | Light et al. |
| 6,195,570 B1 | 2/2001 | Ishida |
| 6,208,771 B1 | 3/2001 | Jared et al. |
| 6,252,948 B1 | 6/2001 | Okamoto |
| 6,304,898 B1 | 10/2001 | Shiigi |
| 6,310,988 B1 | 10/2001 | Flores et al. |
| 6,327,395 B1 | 12/2001 | Hecht et al. |
| 6,330,976 B1 | 12/2001 | Dymetman et al. |
| 6,335,727 B1 | 1/2002 | Morishita et al. |
| 6,341,730 B1 | 1/2002 | Petrie |
| 6,345,304 B1 | 2/2002 | Dymetman et al. |
| 6,419,162 B1 | 7/2002 | Petrie et al. |
| 6,470,096 B2 | 10/2002 | Davies et al. |
| 6,478,232 B1 | 11/2002 | Dowling |
| 6,502,756 B1 | 1/2003 | Fåhraeus |
| 6,529,645 B2 | 3/2003 | Fåhraeus et al. |
| 6,564,252 B1 | 5/2003 | Hickman et al. |
| 6,570,104 B1 | 5/2003 | Ericson et al. |
| 6,586,688 B2 | 7/2003 | Wiebe |
| 6,594,406 B1 | 7/2003 | Hecht |
| 6,606,396 B1 | 8/2003 | Ishibashi et al. |
| 6,625,313 B1 | 9/2003 | Morita et al. |
| 6,641,053 B1 | 11/2003 | Breidenbach et al. |
| 6,658,145 B1 | 12/2003 | Silver et al. |
| 6,661,920 B1 | 12/2003 | Skinner |
| 6,663,008 B1 | 12/2003 | Pettersson et al. |
| 6,674,427 B1 | 1/2004 | Pettersson et al. |
| 6,678,425 B1 | 1/2004 | Flores et al. |
| 6,686,579 B2 | 2/2004 | Fagin et al. |
| 6,689,966 B2 | 2/2004 | Wiebe |
| 6,697,056 B1 | 2/2004 | Bergelson et al. |
| 6,729,543 B1 | 5/2004 | Arons et al. |
| 6,738,053 B1 | 5/2004 | Borgström et al. |
| 6,752,317 B2 | 6/2004 | Dymetman et al. |
| 6,766,942 B1 | 7/2004 | Silverbrook et al. |
| 6,778,703 B1 | 8/2004 | Zlotnick |
| 6,783,069 B1 | 8/2004 | Hecht et al. |
| 6,816,274 B1 | 11/2004 | Silverbrook et al. |
| 6,832,717 B1 | 12/2004 | Silverbrook et al. |
| 6,836,555 B2 | 12/2004 | Ericson et al. |
| 6,958,747 B2 | 10/2005 | Sahlberg et al. |
| 6,985,643 B1 | 1/2006 | Fåhraeus et al. |
| 6,992,655 B2 | 1/2006 | Ericson et al. |
| 2001/0024193 A1 | 9/2001 | Fahraeus |
| 2001/0035861 A1 | 11/2001 | Ericson et al. |
| 2001/0053980 A1 | 12/2001 | Suliman, Jr. et al. |
| 2002/0020750 A1 | 2/2002 | Dymetman et al. |
| 2002/0023029 A1 | 2/2002 | Denver |
| 2002/0091711 A1 | 7/2002 | Ericson |
| 2002/0166895 A1 | 11/2002 | Wiebe et al. |
| 2003/0061188 A1 | 3/2003 | Wiebe et al. |
| 2003/0084002 A1 | 5/2003 | Ericson et al. |
| 2003/0089781 A1 | 5/2003 | Kia et al. |
| 2003/0093376 A1 | 5/2003 | Silverbrook et al. |
| 2003/0093377 A1 | 5/2003 | Silverbrook et al. |
| 2003/0093378 A1 | 5/2003 | Silverbrook et al. |
| 2009/0057419 A1* | 3/2009 | Bartolome et al. ........... 235/494 |

FOREIGN PATENT DOCUMENTS

| | | |
|---|---|---|
| EP | 0 171 284 A2 | 2/1986 |
| EP | 0 206 246 A2 | 12/1986 |
| EP | 0 276 109 A2 | 7/1988 |
| EP | 0 362 970 A2 | 4/1990 |
| EP | 0 469 864 A2 | 2/1992 |
| EP | 0 615 209 A2 | 9/1994 |
| EP | 0 984 390 A2 | 3/2000 |

| | | |
|---|---|---|
| EP | 1 100 032 A2 | 5/2001 |
| GB | 2 280 329 A | 1/1995 |
| GB | 2 306 669 A | 5/1997 |
| JP | 61-43328 | 3/1986 |
| JP | 61-248120 | 11/1986 |
| JP | 64-076176 | 3/1989 |
| JP | 04-143876 | 5/1992 |
| JP | 05-298420 | 11/1993 |
| JP | 06-309084 | 11/1994 |
| JP | 07-098751 | 4/1995 |
| JP | 07-141101 | 6/1995 |
| JP | 07-141104 | 6/1995 |
| JP | 8-297713 | 11/1996 |
| JP | 09-073511 | 3/1997 |
| JP | 10-187907 | 7/1998 |
| JP | 10-257309 | 9/1998 |
| JP | 10-261058 | 9/1998 |
| JP | 11-120278 | 4/1999 |
| KR | 10-225112 | 7/1999 |
| KR | 10-0240627 | 10/1999 |
| RU | 2 078 375 C1 | 4/1997 |
| SE | 9903051-2 | 8/1999 |
| SE | 0001239-3 | 4/2000 |
| SE | 9903541-2 | 2/2002 |
| WO | WO 92/17859 | 10/1992 |
| WO | WO 94/08314 | 4/1994 |
| WO | WO 95/04979 | 2/1995 |
| WO | WO 97/15891 | 5/1997 |
| WO | WO 97/46986 | 12/1997 |
| WO | WO 98/20446 | 5/1998 |
| WO | WO 98/34203 | 8/1998 |
| WO | WO 99/39277 | 8/1999 |
| WO | WO 99/50751 | 10/1999 |
| WO | WO 99/50787 | 10/1999 |
| WO | WO 99/56200 | 11/1999 |
| WO | WO 00/00928 | 1/2000 |
| WO | WO 00/04477 | 1/2000 |
| WO | WO 00/13150 | 3/2000 |
| WO | WO 00/25293 | 5/2000 |
| WO | WO 00/28455 | 5/2000 |
| WO | WO 00/31682 | 6/2000 |
| WO | WO 00/42536 | 7/2000 |
| WO | WO 00/42581 | 7/2000 |
| WO | WO 00/72241 A1 | 11/2000 |
| WO | WO 00/72242 | 11/2000 |
| WO | WO 00/73983 A1 | 12/2000 |
| WO | WO 01/02948 A1 | 1/2001 |
| WO | WO 01/16691 A1 | 3/2001 |
| WO | WO 01/16872 A1 | 3/2001 |
| WO | WO 01/22208 A1 | 3/2001 |
| WO | WO 01/26032 A1 | 4/2001 |
| WO | WO 01/26033 A1 | 4/2001 |
| WO | WO 01/26034 A1 | 4/2001 |
| WO | WO 01/41007 A2 | 6/2001 |
| WO | WO 01/48591 A1 | 7/2001 |
| WO | WO 01/61449 A2 | 8/2001 |
| WO | WO 01/61450 A2 | 8/2001 |
| WO | WO 01/61635 A2 | 8/2001 |

OTHER PUBLICATIONS

IBM Technical Disclosure Bulletin, "Optical Digitizing Stylus", vol. 27, No. 5, Oct. 1984.
IBM Technical Disclosure Bulletin, "Electro-optical Cursor Controller", Apr. 1985 (2 pages).
IBM Technical Disclosure Bulletin, "Pen Input Device", vol. 33, No. 10A, Mar. 1991 (12 pages).
IBM Technical Disclosure Bulletin, "Position Coding for a Pen-On-Paper Device", vol. 33, No. 10A, Mar. 1991 (8 pages).
Office Action, Application No. EP 00968278.2, Dec. 6, 2006 (3 pages).
English Translation of Office Action, Application No. JP 2005-374362, Mar. 20, 2006 (5 pages).
English Translation of Office Action, Application No. JP 2005-374363, Mar. 20, 2006 (4 pages).
English Translation of Office Action, Application No. JP 2005-374364, Mar. 20, 2006 (5 pages).
English Translation of Office Action, Application No. JP 005-374365, Mar. 20, 2006 (5 pages).
Office Action, Application No. CN 200610092495.0, Jan. 4, 2008 (6 pages).
Office Action, Application No. JP 2001-528918, Oct. 6, 2009 (7 pages).
Office Action, Application No. JP 2010-074743, May 11, 2010 (5 pages).
Office Action, Application No. JP 2001-528918, May 11, 2010 (3 pages).
Notice of Allowance mailed Sep. 22, 2003 from the U.S. Patent and Trademark Office for U.S. Appl. No. 09/812,900 (12 pages).
Office Action mailed Mar. 14, 2003 from the U.S. Patent and Trademark Office for U.S. Appl. No. 09/812,900 (14 pages).
Office Action mailed Jun. 28, 2004 from the U.S. Patent and Trademark Office for U.S. Appl. No. 09/812,901 (6 pages).
Office Action mailed Apr. 6, 2005 from the U.S. Patent and Trademark Office for U.S. Appl. No. 09/812,901 (10 pages).
Office Action mailed Sep. 20, 2005 from the U.S. Patent and Trademark Office for U.S. Appl. No. 09/812,901 (11 pages).
Notice of Allowance mailed May 31, 2006 from the U.S. Patent and Trademark Office for U.S. Appl. No. 09/812,901 (4 pages).
Office Action delivered electronically on May 15, 2007 from the U.S. Patent and Trademark Office for U.S. Appl. No. 09/813,112 (83 pages).
Office Action mailed Nov. 24, 2006 from the U.S. Patent and Trademark Office for U.S. Appl. No. 09/813,112 (81 pages).
Office Action mailed Jan. 4, 2006 from the U.S. Patent and Trademark Office for U.S. Appl. No. 09/813,112 (41 pages).
Office Action mailed Jul. 18, 2005 from the U.S. Patent and Trademark Office for U.S. Appl. No. 09/813,112 (31 pages).
Office Action mailed Dec. 9, 2004 from the U.S. Patent and Trademark Office for U.S. Appl. No. 09/813,112 (28 pages).
Office Action mailed Jun. 22, 2004 from the U.S. Patent and Trademark Office for U.S. Appl. No. 09/813,112 (18 pages).
Office Action delivered electronically on Feb. 7, 2008 from the U.S. Patent and Trademark Office for U.S. Appl. No. 09/812,906 (32 pages).
Office Action delivered electronically on Nov. 14, 2007 from the U.S. Patent and Trademark Office for U.S. Appl. No. 09/812,906 (28 pages).
Office Action delivered electronically on Jan. 12, 2007 from the U.S. Patent and Trademark Office for U.S. Appl. No. 09/812,906 (30 pages).
Office Action mailed Jun. 28, 2006 from the U.S. Patent and Trademark Office for U.S. Appl. No. 09/812,906 (35 pages).
Office Action mailed Dec. 23, 2005 from the U.S. Patent and Trademark Office for U.S. Appl. No. 09/812,906 (17 pages).
Office Action mailed Jul. 11, 2005 from the U.S. Patent and Trademark Office for U.S. Appl. No. 09/812,906 (16 pages).
Office Action mailed Feb. 8, 2005 from the U.S. Patent and Trademark Office for U.S. Appl. No. 09/812,906 (13 pages).
Office Action mailed Jul. 15, 2004 from the U.S. Patent and Trademark Office for U.S. Appl. No. 09/812,906 (18 pages).
Office Action delivered electronically on Jul. 16, 2008 from the U.S. Patent and Trademark Office for U.S. Appl. No. 09/746,506 (17 pages).
Office Action delivered electronically on Dec. 21, 2007 from the U.S. Patent and Trademark Office for U.S. Appl. No. 09/746,506 (9 pages).
Office Action delivered electronically on Aug. 20, 2007 from the U.S. Patent and Trademark Office for U.S. Appl. No. 09/746,506 (8 pages).
Office Action delivered electronically on Mar. 6, 2007 from the U.S. Patent and Trademark Office for U.S. Appl. No. 09/746,506 (7 pages).
Office Action mailed Aug. 15, 2006 from the U.S. Patent and Trademark Office for U.S. Appl. No. 09/746,506 (15 pages).
Office Action mailed Mar. 14, 2006 from the U.S. Patent and Trademark Office for U.S. Appl. No. 09/746,506 (14 pages).
Office Action mailed Jan. 26, 2005 from the U.S. Patent and Trademark Office for U.S. Appl. No. 09/746,506 (16 pages).
Office Action mailed Aug. 23, 2004 from the U.S. Patent and Trademark Office for U.S. Appl. No. 09/746,506 (16 pages).

Office Action mailed Nov. 26, 2003 from the U.S. Patent and Trademark Office for U.S. Appl. No. 09/746,506 (15 pages).
Notice of Allowance mailed Sep. 17, 2007 from the U.S. Patent and Trademark Office for U.S. Appl. No. 09/987,159 (11 pages).
Office Action mailed Mar. 25, 2005 from the U.S. Patent and Trademark Office for U.S. Appl. No. 09/987,159 (16 pages).
Office Action mailed Jul. 28, 2004 from the U.S. Patent and Trademark Office for U.S. Appl. No. 09/987,159 (12 pages).
Notice of Allowance mailed Dec. 3, 2009 from the U.S. Patent and Trademark Office for U.S. Appl. No. 11/183,865 (4 pages).
Office Action delivered electronically on May 5, 2009 from the U.S. Patent and Trademark Office for U.S. Appl. No. 11/183,865 (13 pages).
Office Action delivered electronically on Jan. 14, 2009 from the U.S. Patent and Trademark Office for U.S. Appl. No. 11/183,865 (23 pages).
Office Action delivered electronically on Jul. 24, 2008 from the U.S. Patent and Trademark Office for U.S. Appl. No. 11/183,865 (11 pages).
Office Action delivered electronically on Jul. 21, 2008 from the U.S. Patent and Trademark Office for U.S. Appl. No. 10/101,746 (12 pages).
Office Action delivered electronically on Feb. 9, 2007 from the U.S. Patent and Trademark Office for U.S. Appl. No. 10/101,746 (7 pages).
Notice of Allowance mailed Oct. 2, 2006 from the U.S. Patent and Trademark Office for U.S. Appl. No. 09/652,838 (4 pages).
Notice of Allowability mailed Dec. 28, 2005 from the U.S. Patent and Trademark Office for U.S. Appl. No. 09/652,838 (2 pages).
Notice of Allowance mailed Nov. 17, 2005 from the U.S. Patent and Trademark Office for U.S. Appl. No. 09/652,838 (4 pages).
Office Action mailed Feb. 8, 2005 from the U.S. Patent and Trademark Office for U.S. Appl. No. 09/652,838 (9 pages).
Office Action mailed Jul. 13, 2004 from the U.S. Patent and Trademark Office for U.S. Appl. No. 09/652,838 (10 pages).
Office Action mailed Feb. 2, 2004 from the U.S. Patent and Trademark Office for U.S. Appl. No. 09/652,838 (8 pages).
Office Action mailed Apr. 24, 2003 from the U.S. Patent and Trademark Office for U.S. Appl. No. 09/652,838 (11 pages).
Office Action mailed Oct. 2, 2002 from the U.S. Patent and Trademark Office for U.S. Appl. No. 09/652,838 (10 pages).
Notice of Allowance mailed Dec. 9, 2009 from the United States Patent & Trademark Office for U.S. Appl. No. 09/746,778 (6 pages).
Office Action delivered electronically on Aug. 14, 2009 from the U.S. Patent and Trademark Office for U.S. Appl. No. 09/746,778 (11 pages).
Office Action delivered electronically on Feb. 5, 2009 from the U.S. Patent and Trademark Office for U.S. Appl. No. 09/746,778 (18 pages).
Office Action delivered electronically on May 1, 2008 from the U.S. Patent and Trademark Office for U.S. Appl. No. 09/746,778 (20 pages).
Notice of Allowance mailed Aug. 29, 2007 from the United States Patent & Trademark Office for U.S. Appl. No. 09/746,778 (7 pages).
Office Action delivered electronically on Mar. 23, 2007 from the U.S. Patent and Trademark Office for U.S. Appl. No. 09/746,778 (18 pages).
Office Action mailed Sep. 6, 2006 from the U.S. Patent and Trademark Office for U.S. Appl. No. 09/746,778 (17 pages).
Office Action mailed Feb. 22, 2006 from the U.S. Patent and Trademark Office for U.S. Appl. No. 09/746,778 (15 pages).
Office Action mailed Nov. 16, 2005 from the U.S. Patent and Trademark Office for U.S. Appl. No. 09/746,778 (13 pages).
Office Action mailed Apr. 7, 2004 from the U.S. Patent and Trademark Office for U.S. Appl. No. 09/746,778 (10 pages).
Office Action delivered electronically on Jan. 26, 2009 from the U.S. Patent and Trademark Office for U.S. Appl. No. 10/960,008 (12 pages).
Office Action delivered electronically on May 27, 2008 from the U.S. Patent and Trademark Office for U.S. Appl. No. 10/960,008 (10 pages).
Notice of Allowance mailed May 4, 2007 from the United States Patent & Trademark Office for U.S. Appl. No. 10/714,894 (4 pages).
Office Action mailed Jun. 16, 2006 from the U.S. Patent and Trademark Office for U.S. Appl. No. 10/714,894 (7 pages).
Notice of Allowance mailed Oct. 2, 2006 from the United States Patent & Trademark Office for U.S. Appl. No. 10/727,586 (13 pages).
Office Action mailed Mar. 10, 2006 from the U.S. Patent and Trademark Office for U.S. Appl. No. 10/727,586 (6 pages).
Office Action mailed Sep. 30, 2005 from the U.S. Patent and Trademark Office for U.S. Appl. No. 10/727,586 (8 pages).
Office Action mailed Feb. 23, 2005 from the U.S. Patent and Trademark Office for U.S. Appl. No. 10/727,586 (7 pages).
U.S. Appl. No. 60/138,399, filed Jun. 9, 1999 (31 pages).
U.S. Appl. No. 60/157,967, filed Oct. 6, 1999 (33 pages).
International Preliminary Examination Report for International Application No. PCT/SE00/01895 mailed Jan. 7, 2002 (7 pages).
Dymetman et al., Intelligent Paper, Xerox Research Center Europe: published in Apr. 1998.
Hoshi et al. "A Mobile Pen-Based Computing System for Cellular Telephone Networks," IEEE, 1993.
"United Airlines Automates In-Flight Shopping with Mobile Handhelds Based on PenRight!" Business Wire, Nov. 30, 1998 (2 pages).
Abstracts of Japan, published Jul. 21, 1998, World Patent Index Accession 1994-135682, Pub. No. 10187907 (1 page).
Meyer, Andre, "Pen Computing: A Technology Overview and a Vision", ACM SIGCHI Bulletin, vol. 27, No. 3, Jul. 1995, pp. 46-90.
Ny Teknik, vol. 8m "Papper och penna nasta," Feb. 21, 2001 (10 pages).
Dave Farber, Radio Shack Gives Away Barcode Scanner, But is Privacy Compromised?, Sep. 14, 2000, Telecom Digest V2000 #53, Document identifier labeled as Interesting-People Message (5 pages).
Japanese Patent Office, Office Action in Application No. 2008-189559, mailed Nov. 9, 2010, 7 pages.
Japanese Patent Office, Office Action in Application No. 2010-085606, mailed Oct. 19, 2010, 5 pages.
Extended European Search Report in Application No. 10156315.3, mailed Jun. 15, 2010, 5 pages.

* cited by examiner

PRODUCT PROVIDED WITH A CODING PATTERN AND APPARATUS AND METHOD FOR READING THE PATTERN

This application is a continuation of U.S. Non-Provisional application Ser. No. 11/268,562, filed Nov. 8, 2005 and issued as U.S. Pat. No. 7,588,191 on Sep. 15, 2009, which is a continuation U.S. Non-Provisional application Ser. No. 10/714,894, filed on Nov. 18, 2003 and issued as U.S. Pat. No. 7,281,668 on Oct. 16, 2007, which is a divisional of U.S. Non-Provisional application Ser. No. 09/676,914, filed on Oct. 2, 2000 and issued as U.S. Pat. No. 6,663,008 on Dec. 16, 2003, and claims the benefit of U.S. Provisional Application No. 60/157,967, filed Oct. 6, 1999; and Application No. SE 9903541-2, filed in Sweden on Oct. 1, 1999, which are all incorporated herein by reference.

FIELD OF THE INVENTION

This invention concerns a product which is provided with a coding pattern, which comprises a number of marks, each of which represents one of at least two different values. The invention also concerns use of such a coding pattern.

BACKGROUND OF THE INVENTION

Storing coded information on a surface by means of different types of marks is already known.

U.S. Pat. No. 5,852,434 describes, for example, a position-coding pattern which codes X-Y-coordinates for a number of positions on a writing surface. The position-coding pattern makes it possible for a user to record electronically graphic information which is created on a writing surface by continuously reading the position-coding pattern.

Three examples of the construction of the position-coding pattern are given in U.S. Pat. No. 5,852,434. In the first example the pattern consists of symbols, each of which is constructed of three concentric circles. The outer circle represents the X-coordinate and the middle circle the Y-coordinate. Both the outer circles are additionally divided into 16 parts which, depending upon whether they are filled in or not, indicate different numbers. This means that each pair of coordinates X, Y is coded by a complex symbol with a particular appearance.

In the second example, the coordinates of each point on the writing surface are given by means of barcodes, a bar-code for the X-coordinate being shown above a barcode for the Y-coordinate.

A checkered pattern which can be used to code the X- and Y-coordinates is given as a third example. However, there is no explanation as to how the checkered pattern is constructed or how it can be converted into coordinates.

A problem with the known pattern is that it is constructed of complex symbols and the smaller these symbols are made, the more difficult it is to produce the patterned writing surface and the greater the risk of incorrect position determinations, while the larger the symbols are made, the poorer the position resolution becomes.

A further problem is that the processing of the detected position-coding pattern becomes rather complicated, due to the fact that a processor has to interpret complex symbols.

An additional problem is that the detector or sensor which is to record the position-coding pattern must be constructed in such a way that it can record four symbols at the same time so that it is certain to cover at least one symbol in its entirety, which is necessary in order for the position determination to be able to be carried out. The ratio between the required sensor surface and the surface of the position-coding pattern which defines a position is thus large.

In EP 0 578 692 a position-coding pattern is described which is constructed of cells in the form of squares. The value of the cells is determined by their appearance, for example their color. The cells can be separated by separation zones so that two adjacent cells with the same color can be distinguished. The position-coding pattern differs from that according to U.S. Pat. No. 5,852,434 in that a particular number of cells, that is symbols, together code a position. The coding is in addition floating, which means that an arbitrary partial surface of the pattern which contains the above-mentioned number of cells codes a position. Each cell thus contributes to the coding of several positions. In this way the ratio between the required sensor surface and the part of the position-coding pattern which defines a position is less than in the above-mentioned US patent. In addition, each cell is less complex and therefore the processor which is to decode the position-coding pattern needs to be able to recognize fewer different elements. However, the processor needs to be able to locate and distinguish at least two different cells.

EP 0 171 284 B1 shows another floating position-coding pattern which is constructed of horizontal and vertical lines, the vertical lines coding the position in the horizontal direction and the horizontal lines coding the position in the vertical direction. The lines can be found in positions which are a multiple of 1 mm. The presence of a line in such a position codes a one (1), the absence of a line in such a position codes a zero (0).

It is, however, difficult to record and decode a pattern of lines, as the intersections between the lines can be difficult to record. In addition, it is often the case that the sensor is not held parallel to the base, which results in a perspective where the lines are no longer parallel. It can then be difficult to determine whether a line is actually missing. In addition, there must not be too many missing consecutive lines, as difficulties can then arise in the decoding. Furthermore, the information content is small.

Applicant's Swedish Patent Application SE 9901954-9, which was filed on 28 May 1999 and which was not publicly available at the time of filing the present application and thereby does not constitute prior art, describes an additional position-coding pattern of the floating type in which the position information is coded graphically by means of dots of a first and a second size, a dot of the first size corresponding to a zero (0) and a dot of the second size corresponding to a one (1). A plurality of dots together code the coordinates for a position.

It is a general desire that coding patterns which are used to store information on a surface must be able to code a lot of information per unit area and must be simple to detect and decode even when subjected to interference of difference kinds.

SUMMARY OF THE INVENTION

An object of the present invention is therefore to provide a product with a coding pattern which fulfils this requirement to at least as great an extent as the known coding patterns.

The invention concerns more specifically a product which is provided with a coding pattern, which comprises a plurality of marks, each of which represents one of at least two different values. The coding pattern comprises a plurality of nominal positions, each of said marks being associated with one of said plurality of nominal positions and the value of each mark being determined by its location relative to its nominal position.

In prior art the coding is usually carried out by means of the appearance of one or more symbols or marks, the value of each symbol or mark being determined by its appearance. The device which decodes the coding pattern must consequently be able to recognize different symbols or marks, which increases the sensitivity to interference and makes the decoding more difficult.

According to the present invention, the value of each mark is determined instead by how it is located relative to its nominal position. As the value is based on the location of the mark, all the marks can have an identical appearance. The coding pattern is consequently simple to apply on the product. Furthermore, the detection of the marks is simple to carry out and unaffected by the presence of other marks on the product which are not part of the coding pattern. In addition, the coding pattern can be realized more simply using other technology than optical technology, for example as a chemical, electrical or mechanical pattern. The design of the mark also means that a product which is provided with a coding pattern will be more esthetically pleasing when the mark is optically readable. Finally, it is possible to have a large distance between the marks in relation to the density of the information, which means that the coding pattern is less sensitive to motion blur which can arise during the reading.

By nominal position is meant in this connection a position which is detectable and relative to which the mark can be located in different ways. The nominal positions can be marked on the product, but they can also be virtual and detectable indirectly.

It should also be pointed out that the value which a mark represents is preferably a numerical value, but can also be a character value, such a letter or some kind of symbol.

The location of the mark can preferably be determined by its center of gravity, which makes possible the use of marks of irregular shape and reduces the demands when applying the pattern on the product.

In a preferred embodiment, each nominal position is allocated a mark. The advantage is hereby obtained that all values are coded by a mark. The absence of a mark thus always constitutes an error.

The marks can be placed both in the nominal position and outside the same. A possible representation of a binary pattern could, for example, be that a mark in the nominal position represents a zero and a mark outside the nominal position represents a one, or vice versa.

In a preferred embodiment, however, essentially all the marks are displaced relative to their nominal position. In this way the pattern is random, while at the same time it is so uniform that it appears even to the eye.

A few marks should, however, be able to be in their nominal position in order to indicate some specific parameters, for example the position of the virtual raster.

In addition, in a preferred embodiment, essentially all the marks are displaced the same distance relative to their nominal position. If it is known where the nominal position is located, it is sufficient to look for a mark at a certain distance from the nominal position, which facilitates the locating of the marks and reduces the risk of errors. In addition, it is sufficient to detect that there is a mark at the relevant distance from the nominal position. The appearance of this mark is of subordinate significance, which reduces the need for precision in applying the pattern on the product.

In a particularly preferred embodiment, each mark is displaced in one of four orthogonal directions relative to its nominal position. By knowing the nominal position the mark accordingly only needs to be looked for in four different directions. This facilitates and speeds up the locating of the marks. In addition, it reduces the risk of errors, as marks which are not part of the pattern and which are situated in other positions than along the four orthogonal directions are not detected and thereby do not run the risk of affecting the decoding of the pattern.

In order for it to be possible to determine the locations of the marks relative to the nominal positions, the nominal positions must be known. For this purpose the coding pattern preferably comprises a raster with raster lines, where the intersections of the raster lines define the nominal positions of the marks. The nominal positions are thus regularly arranged on the product. This facilitates the detection and reduces the risk of error. In addition, it makes possible the use of a virtual raster.

In a preferred embodiment, the distance between the raster lines is approximately 250 µm to 300 µm, preferably 300 µm. This makes possible a high density of information, but still with reliable detection.

In a preferred embodiment, the raster lines also form a rectangular, preferably square, grid. In the latter case, the distance between the raster lines is thus the same in both directions.

In a preferred embodiment, each mark is additionally displaced along one of the raster lines. When the raster is known, the marks can thus be located in an efficient way by searching along the well-defined directions which the raster lines represent.

In a preferred embodiment, each mark is displaced from its nominal position by a distance which is ¼ to ⅛, preferably ⅙, of the distance between the raster lines. If the displacement is approximately ⅙ of the raster line interval, it is relatively easy to determine to which nominal position the mark belongs. If the displacement is less than approximately ⅛, it can be difficult to detect, that is the resolution requirement is too great. If the displacement is more than approximately ¼, it can be difficult to determine to which nominal position the mark belongs. This applies in particular if the representation of the coding pattern recorded by the sensor or detector is distorted, which for example can occur if an optical sensor is held at an angle relative to the surface on which the coding pattern is arranged. With the above-mentioned preferred raster line interval of 300 µm, the preferred displacement is thus 50 µm.

The raster with the raster lines can be indicated on the surface in such a way that it can be read directly by the device which detects the marks. In this case, however, the raster must also be able to be detected by the device and distinguished from the marks. In a preferred embodiment, the raster is instead virtual, which means that it is not marked on the product in any way, but can be located from the locations of the marks. Instead of being read from the product, it is thus determined indirectly by means of the marks.

As already mentioned, essentially all the marks in a preferred embodiment have an essentially identical appearance. This makes it simpler to arrange them on the product.

The marks have preferably some simple geometric shape. They are thus advantageously approximately circular, triangular or rectangular. They can be filled-in or not, but the former is preferable as detection is then simpler.

The mark should not cover its nominal position and should therefore not have a larger diameter than twice the displacement, that is 200%. This is, however, not critical, as a certain amount of overlapping is permissible, for example 240%. The smallest size is determined in the first place by the resolution of the sensor and the requirements of the printing process used to produce the pattern. However, in practice the marks should not have a smaller diameter than approximately 50% of the displacement, in order to avoid problems with particles and noise in the sensor.

The coding pattern can be realized with any parameters which can be used to produce marks of the above-mentioned type which can be detected by a detector. The parameters can be electrical or chemical or of some other type. The coding pattern is, however, preferably optically readable in order for it to be simpler to arrange on the product. It can, for example, be printed on the product.

In a preferred embodiment, the coding pattern is readable by infrared light. In this way information which is not readable by infrared light can be overlaid on the coding pattern without interfering with the reading of this.

In a preferred embodiment, the marks constitute 0.25% to 20%, preferably approximately 9%, of the surface which is taken up by the coding pattern. If the pattern is printed, for example, on a sheet of white paper, it will in this case only result in a pale gray shading of the paper, which means that it will appear as essentially normal paper.

The coding pattern is preferably a position-coding pattern which codes a plurality of positions on the product, each position being coded by means of a plurality of marks. The coding pattern can, however, also be used to code other information.

The product can be any product which can be provided with a coding pattern. It does not need to be a physical product, but can also be electronic, for example an image or a surface on a computer screen on which the coding pattern is overlaid in electronic form.

According to another aspect of the invention, this concerns use of a coding pattern which comprises a plurality of marks, each of which represents one of at least two different values, and a plurality of nominal positions, each of said plurality of marks being associated with one of said plurality of nominal positions and the value of each mark being determined by its location relative to its nominal position.

The advantages of the use of such a pattern are apparent from the discussion of the coding pattern on the product. The features which are mentioned for the coding pattern on the product also apply, of course, to the use of the coding pattern. The use can, for example, consist of printing out the coding pattern on a product, storing the coding pattern in electronic form or decoding the coding pattern.

BRIEF DESCRIPTION OF THE DRAWINGS

In the following the invention will be described in greater detail by way of an embodiment and with reference to the accompanying drawings, in which

FIG. 7(a)-(d) illustrate alternative mark positions for alternative embodiments of the position coding patterns described in the present application.

DESCRIPTION OF A PREFERRED EMBODIMENT

Figure 1:
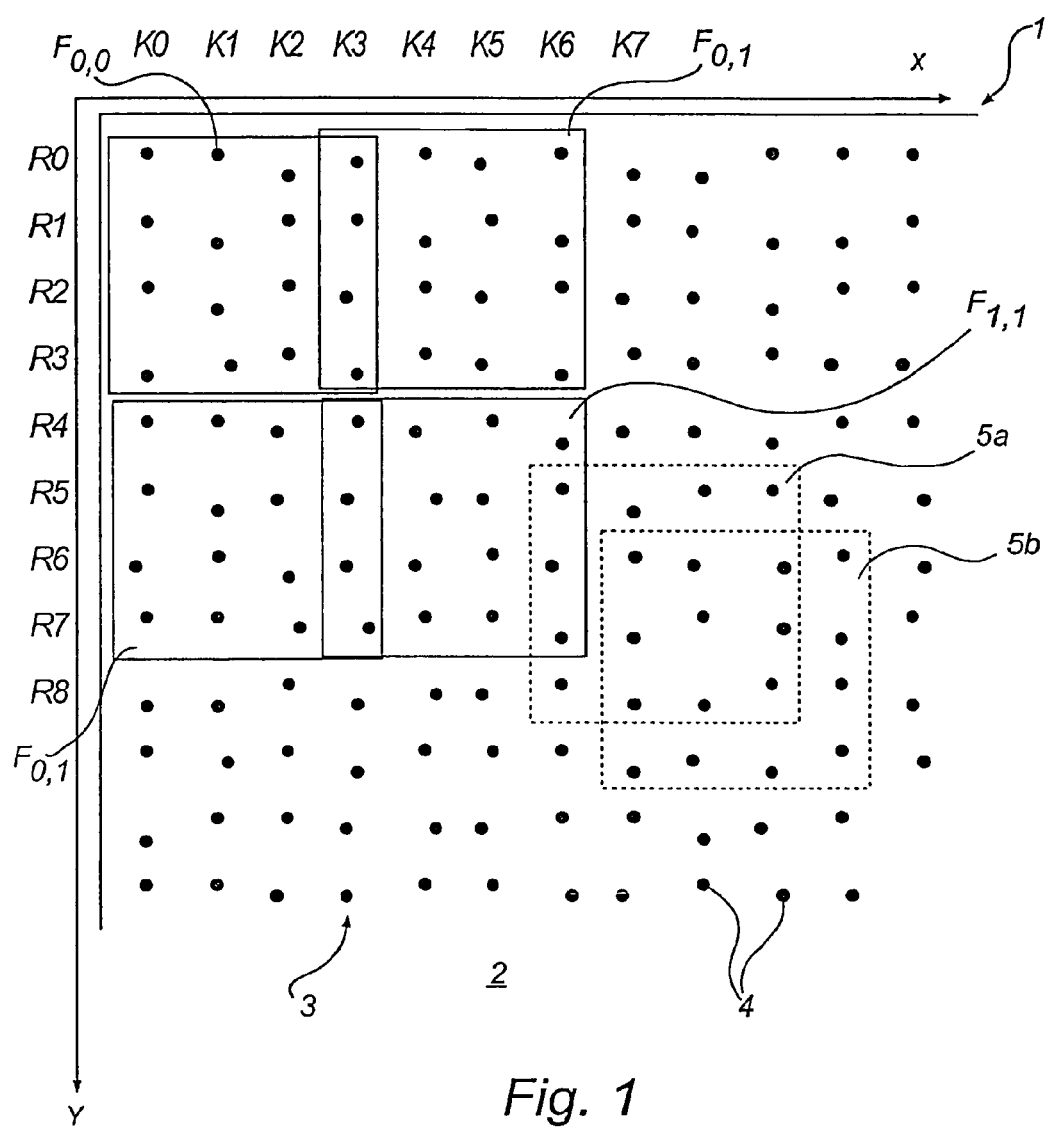
FIG. 1 shows schematically an embodiment of a product which is provided with a position-coding pattern.
Figure 2:
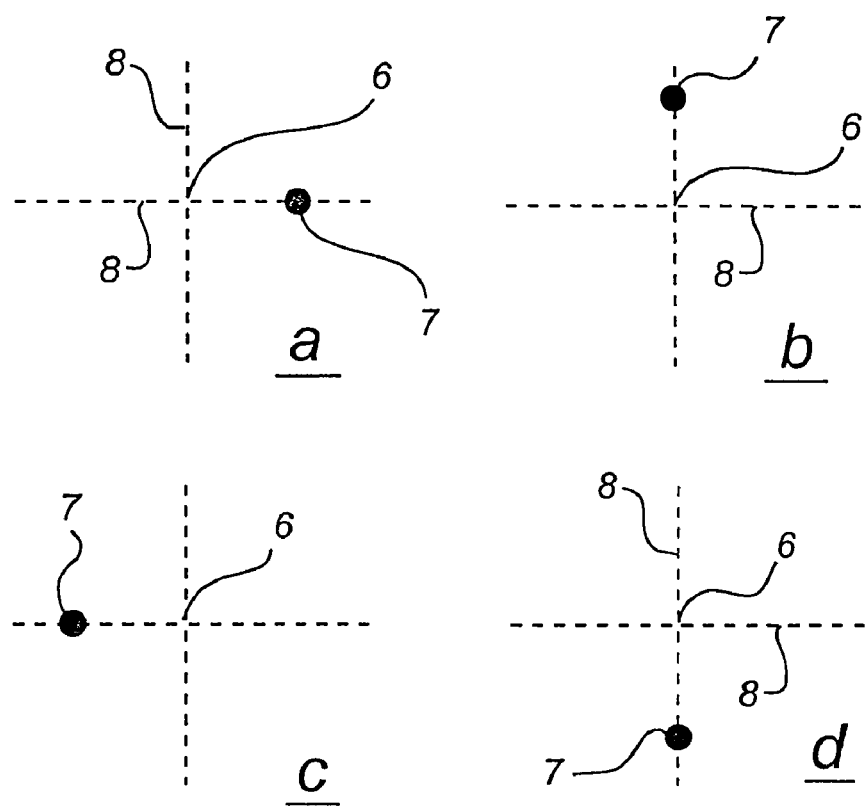
FIGS. 2a-2d show schematically how the marks can be designed and positioned in an embodiment of the invention.

FIG. 1 shows a part of a product in the form of a sheet of paper 1, which on at least part of its surface 2 is provided with an optically readable position-coding pattern 3 which makes possible position determination.

The position-coding pattern comprises marks 4, which are systematically arranged across the surface 2, so that it has a "patterned" appearance. The sheet of paper has an X-coordinate axis and a Y-coordinate axis. The position determination can be carried out on the whole surface of the product. In other cases the surface which enables position determination can constitute a small part of the product.

The pattern can, for example, be used to provide an electronic representation of information which is written or drawn on the surface. The electronic representation can be provided, while writing on the surface with a pen, by continuously determining the position of the pen on the sheet of paper by reading the position-coding pattern.

The position-coding pattern comprises a virtual raster, which is thus neither visible to the eye nor can be detected directly by a device which is to determine positions on the surface, and a plurality of marks 4, each of which, depending upon its location, represents one of four values "1" to "4" as described below. In this connection it should be pointed out that for the sake of clarity the position-coding pattern in FIG. 1 is greatly enlarged. In addition, it is shown arranged only on part of the sheet of paper.

The position-coding pattern is so arranged that the position of a partial surface on the total writing surface is determined unambiguously by the marks on this partial surface. A first and a second partial surface 5a, 5b are shown by broken lines in FIG. 1. The second partial surface partly overlaps the first partial surface. The part of the position-coding pattern (here 4*4 marks) on the first partial surface 5a codes a first position and the part of the position-coding pattern on the second partial surface 5b codes a second position. The position-coding pattern is thus partly the same for the adjoining first and second positions. Such a position-coding pattern is called "floating" in this application. Each partial surface codes a specific position.

FIGS. 2a-d show how a mark can be designed and how it can be located relative to its nominal position 6. The nominal position 6, which also can be called a raster point, is represented by the intersection of the raster lines 8. The mark 7 has the shape of a circular dot. A mark 7 and a raster point 6 can together be said to constitute a symbol.

In one embodiment, the distance between the raster lines is 300 µm and the angle between the raster lines is 90 degrees. Other raster intervals are possible, for example 254 µm to suit printers and scanners which often have a resolution which is a multiple of 100 dpi, which corresponds to a distance between points of 25.4 mm/100, that is 254 µm.

The value of the mark thus depends upon where the mark is located relative to the nominal position. In the example in FIG. 2 there are four possible locations, one on each of the raster lines extending from the nominal position. The displacement from the nominal position is the same size for all values.

Each mark 7 is displaced relative to its nominal position 6, that is no mark is located at the nominal position. In addition, there is only one mark per nominal position and this mark is displaced relative to its nominal position. This applies to the marks which make up the pattern. There can be other marks on the surface which are not part of the pattern and thus do not contribute to the coding. Such marks can be specks of dust, unintentional points or marks and intentional marks, from for example a picture or figure on the surface. Because the position of the pattern marks on the surface is so well defined, the pattern is unaffected by such interference.

In one embodiment, the marks are displaced by 50 μm relative to the nominal positions 6 along the raster lines 8. The displacement is preferably ⅙ of the raster interval; as it is then relatively easy to determine to which nominal position a particular mark belongs. The displacement should be at least approximately ⅛ of the raster interval, otherwise it becomes difficult to determine a displacement, that is the requirement for resolution becomes great. On the other hand, the displacement should be less than approximately ¼ of the raster interval in order for it to be possible to determine to which nominal position a mark belongs.

The displacement does not need to be along the raster line, but the marks can be positioned in separate quadrants. However, if the marks are displaced along the raster lines, the advantage is obtained that the distance between the marks has a minimum which can be used to recreate the raster lines, as described in greater detail below.

Each mark consists of a more or less circular dot with a radius which is approximately the same size as the displacement or somewhat less. The radius can be 25% to 120% of the displacement. If the radius is much larger than the displacement, it can be difficult to determine the raster lines. If the radius is too small, a greater resolution is required to record the marks.

The marks do not need to be circular or round, but any suitable shape can be used, such as square or triangular, etc.

Normally, each mark covers a plurality of pixels on a sensor chip and, in one embodiment, the center of gravity of these pixels is recorded or calculated and used in the subsequent processing. Therefore the precise shape of the mark is of minor significance. Thus relatively simple printing processes can be used, provided it can be ensured that the center of gravity of the mark has the required displacement.

In the following, the mark in FIG. 2a represents the value 1, in FIG. 2b the value 2, in FIG. 2c the value 3 and in FIG. 2d the value 4.

Each mark can thus represent one of four values "1 to 4". This means that the position-coding pattern can be divided into a first position code for the x-coordinate and a second position code for the y-coordinate. The division is carried out as follows:

| Mark value | x-code | y-code |
|---|---|---|
| 1 | 1 | 1 |
| 2 | 0 | 1 |
| 3 | 1 | 0 |
| 4 | 0 | 0 |

The value of each mark is thus converted into a first value, here bit, for the x-code and a second value, here bit, for the y-code. In this way two completely independent bit patterns are obtained by means of the pattern. Conversely, two or more bit patterns can be combined into a common pattern which is coded graphically by means of a plurality of marks in accordance with FIG. 2.

Each position is coded by means of a plurality of marks. In this example, 4*4 marks are used to code a position in two dimensions, that is an x-coordinate and a y-coordinate.

The position code is constructed by means of a number series of ones and zeros, a bit series, which has the characteristic that no four bit long bit sequence occurs more than once in the bit series. The bit series is cyclic, which means that the characteristic also applies when the end of the series is connected to its beginning. A four-bit sequence has thus always an unambiguously determined position number in the bit series.

The bit series can be a maximum of 16 bits long if, it is to have the characteristic described above for bit sequences of four bits. In this example, however, only a seven bit long bit series is used, as follows:

"0 0 0 1 0 1 0".

This bit series contains seven unique bit sequences of four bits which code a position number in the series as follows:

| Position number in the series | Sequence |
|---|---|
| 0 | 0001 |
| 1 | 0010 |
| 2 | 0101 |
| 3 | 1010 |
| 4 | 0100 |
| 5 | 1000 |
| 6 | 0000 |

To code the x-coordinate, the bit series is written sequentially in columns over all the surface which is to be coded, where the left column $K_o$ corresponds to the x-coordinate zero (0). In one column the bit series can thus be repeated several times in succession.

The coding is based on differences or position displacements between adjacent bit series in adjacent columns. The size of the difference is determined by the position number (that is the bit sequence) in the bit series with which the adjacent columns commence.

More precisely, if one takes the difference $\Delta_n$ modulo seven between, on the one hand, a position number which is coded by a four-bit sequence in a first column $K_n$ and which can thus have the value 0 to 6, and, on the other hand, a position number which is coded by an adjacent four-bit sequence at a corresponding "height" in an adjacent column $K_{n+1}$, the difference will be the same regardless of where, that is at what "height", along the two columns the difference is created. Using the difference between the position numbers for two bit sequences in two adjacent columns, it is thus possible to code an x-coordinate which is independent of and constant for all y-coordinates.

As each position on the surface is coded by a partial surface consisting of 4*4 marks in this example, there are four vertical bit sequences available and thus three differences, each with the value 0 to 6, for coding the x-coordinate.

The pattern is divided into code windows F with the characteristic that each code window consists of 4*4 marks. There are thus four horizontal bit sequences and four vertical bit sequences available, so that three differences can be created in the x-direction and four positions can be obtained in the y-direction. These three differences and four positions code the position of the partial surface in the x-direction and the y-direction. Adjacent windows in the x-direction have a common column, see FIG. 1. Thus the first code window $F_{o,o}$ contains bit sequences from the columns $K_0, K_1, K_2, K_3$, and bit sequences from the rows $R_o, R_1, R_2, R_3$. As differences are used in the x-direction, the next window diagonally in the x-direction and y-direction, the window $F_{1,1}$, contains bit sequences from the columns $K_3, K_4, K_5, K_6$, and the rows $R_4, R_5, R_6, R_7$. Considering the coding in just the x-direction, the code window can be considered to have an unlimited extent in the y-direction. Correspondingly, considering the coding in just the y-direction, the code window can be considered to have an unlimited extent in the x-direction. Such a first and second code window with unlimited extent in the y-direction and x-direction respectively together form a code window of the type shown in FIG. 1, for example $F_{o,o}$.

Each window has window coordinates $F_X$, which give the position of the window in the x-direction, and $F_Y$, which give the position of the window in the y-direction. Thus the correspondence between the windows and columns is as follows.

$K_i=3 F_X$
$R_j=4 F_Y$

The coding is carried out in such a way that for the three differences, one of the differences $\Delta_0$ always has the value 1 or 2, which indicates the least significant digit $S_o$ for the number which represents the position of the code window in the x-direction, and both the other differences $\Delta_1$, $\Delta_2$, have values in the range 3 to 6, which indicates the two most significant digits $S_1$, $S_2$, for the coordinate of the code window. Thus no difference can be zero for the x-coordinates, as that would result in too symmetrical a code pattern. In other words, the columns are coded so that the differences are as follows: (3 to 6); (3 to 6); (1 to 2); (3 to 6); (3 to 6); (1 to 2); (3 to 6); (3 to 6); (1 to 2); (3 to 6); (3 to 6); ....

Each x-coordinate is thus coded by two differences $\Delta_1$, $\Delta_2$ of between 3 and 6 and a subsequent difference $\Delta_0$ which is 1 or 2. By subtracting one (1) from the least difference $\Delta_0$ and three (3) from the other differences, three digits are obtained, $S_2$, $S_1$, $S_O$, which in a mixed base directly give the position number of the code window in the x-direction, from which the x-coordinate can then be determined directly, as shown in the example below. The position number of the code window is:

$$S_2*(4*2)+S_1*2+S_0*1$$

Using the principle described above, it is thus possible to code code windows 0, 1, 2, ..., 31, using a position number for the code window consisting of three digits which are represented by three differences. These differences are coded by a bit pattern which is based on the number series above. The bit pattern can finally be coded graphically by means of the marks in FIG. 2.

In many cases, when a partial surface is recorded consisting of 4*4 marks, a complete position number which codes the x-coordinate will not be obtained, but parts of two position numbers will, as the partial surface in many cases does not coincide with one code window but covers parts of two adjacent code windows in the x-direction. However, as the difference for the least significant digit $S_0$ of each number is always 1 or 2, a complete position number can easily be reconstructed, as it is known what digit is the least significant.

The y-coordinates are coded in accordance with approximately the same principle as that used for the x-coordinates by means of code windows. The cyclic number series, that is the same number series as is used for the x.-coding, is written repeatedly in horizontal rows across the surface which is to be position coded. Precisely as for the x-coordinates, the rows are made to start in different positions, that is with different bit sequences, in the number series. For the y-coordinates, however, differences are not used, but the coordinates are coded by values which are based on the start position of the number series in each row. When the x-coordinate has been determined for a partial surface with 4*4 marks, the start positions in the number series can in fact be determined for the rows which are included in the y-code for the 4*4 marks.

In the y-code, the least significant digit $S_0$ is determined by letting this be the only digit which has a value in a particular range. In this example, a row of four starts in position 0 to 1 in the number series, in order to indicate that this row concerns the least significant digit $S_0$ in a code window, and the three other rows start in any of the positions 2 to 6 in order to indicate the other digits $S_1$ $S_2$ $S_3$ in the code window. In the y-direction there is thus a series of values as follows:

(2 to 6); (2 to 6); (2 to 6); (0 to 1); (2 to 6); (2 to 6); (2 to 6); (0 to 1); (2 to 6); ....

Each code window is thus coded by three values between 2 and 6 and a subsequent value between 0 and 1.

If zero (0) is subtracted from the low value and two (2) from the other values, a position in the y-direction $S_3$ $S_2$ $S_1$ $S_0$ in mixed base is obtained, in a way similarly to the x-direction, from which the position number of the code window can be determined directly, which is:

$$S_3*(5*5*2)+S_2*(5*2)+S_1*2+S_0*1$$

Using the method above, it is possible to code 4*4*2=32 position numbers in the x-direction for the code windows. Each code window comprises bit sequences from three columns, which gives 3*32=96 columns or x-coordinates. In addition, it is possible to code 5*5*5*2=250 position numbers in the y-direction for the code windows. Each such position number comprises horizontal bit sequences from 4 rows, which gives 4*250=1000 rows or y-coordinates. In total it is thus possible to code 96000 coordinate positions.

As the x-coding is based on differences, it is, however, possible to select the position in which the first number series in the first code window starts. If it is taken into account that this first number series can start in seven different positions, it is possible to code 7*96000=672000 positions. The start position of the first number series in the first column $K_0$ can be calculated when the x- and y-coordinates have been determined. The above-mentioned seven different start positions for the first series can code different pages or writing surfaces of a product.

Theoretically, a partial surface with 4*4 symbols, which each have four values, can code $4^{4*4}$ positions, that is 4,294,967,296 positions. In order to make possible floating determination of the position of a partial surface, there is thus a redundancy factor in excess of 6000 (4294967296/672000).

The redundancy consists partly in the restrictions on the size of the differences, and partly in only 7 bits out of 16 being used in the position code. This latter fact can, however, be used to determine the rotational position of the partial surface. If the next bit in the bit series is added to the four-bit sequence, a five-bit sequence is obtained. The fifth bit is obtained by reading the adjacent bit immediately outside the partial surface which is being used. Such an additional bit is often easily available.

The partial surface which is read by the sensor can have four different rotational positions, rotated through 0, 90, 180 or 270 degrees relative to the code window. In those cases where the partial surface is rotated, the reading of the code will, however, be such that the code read will be inverted and reversed in either the x-direction or the y-direction or both, in comparison to the case where if it had been read at 0 degrees. This assumes, however, that a slightly different decoding of the value of the marks is used according to the table below.

| Mark value | x-code | y-code |
|---|---|---|
| 1 | 0 | 0 |
| 2 | 1 | 0 |

| Mark value | x-code | y-code |
| --- | --- | --- |
| 3 | 1 | 1 |
| 4 | 0 | 1 |

The above-mentioned five-bit sequence has the characteristic that it only occurs the right way round and not in inverted and reversed form in the seven-bit series. This is apparent from the fact that the bit series (0 0 0 1 0 1 0) contains only two "ones". Therefore all five-bit sequences must contain at least three zeros, which after inversion (and reversing, if any) results in three ones, which cannot occur. Thus if a five-bit sequence is found which does not have a position number in the bit series, it can be concluded that the partial surface should probably be rotated and the new position tested.

In order to provide further illustrations of the invention according to this embodiment, here follows a specific example which is based on the described embodiment of the position code.

Figure 3:
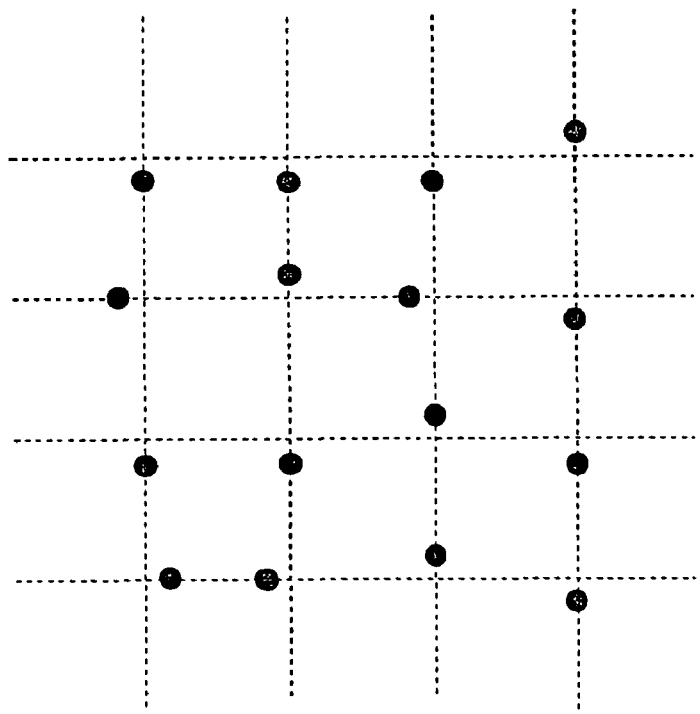
FIG. 3 shows schematically an example of 4*4 symbols which are used to code a position.

FIG. 3 shows an example of an image with 4*4 marks which are read by a device for position determination.

These 4*4 marks have the following values:

4 4 4 2
3 2 3 4
4 4 2 4
1 3 2 4

These values represent the following binary x- and y-codes:

| x-code: | y-code: |
| --- | --- |
| 0 0 0 0 | 0 0 0 1 |
| 1 0 1 0 | 0 1 0 0 |
| 0 0 0 0 | 0 0 1 0 |
| 1 1 0 0 | 1 0 1 0 |

The vertical bit sequences in the x-code code the following positions in the bit series: 2 0 4 6. The differences between the columns are −2 4 2, which modulo 7 gives: 5 4 2, which in mixed base codes the position number of the code window: $(5-3)*8+(4-3)*2+(2-1)=16+2+1=19$. The first coded code window has the position number 0. Thus the difference which lies in the range 1 to 2 and which appears in the 4*4 marks of the partial surface is the twentieth such difference. As additionally there are in total three columns for each such difference and there is a starting column, the vertical sequence furthest to the right in the 4*4 x-code belongs to the 61st column (column 60) in the x-code ($3*20+1=61$) and the vertical sequence furthest to the left belongs to the 58th column (column 57).

The horizontal bit sequences in the y-code code the positions 0 4 1 3 in the number series. As these horizontal bit sequences start in the 58th column, the start position of the rows is the value of these minus 57 modulo 7, which gives the start positions 6 3 0 2. Converted to digits in the mixed base, this becomes 6-2, 3-2, 0-0, 2-2=4 1 0 0, where the third digit is the least significant digit in the number concerned. The fourth digit is then the most significant digit in the next number. It must in this case be the same as in the number concerned. (The exception is when the number concerned consists of highest possible digits in all positions. Then it is known that the beginning of the next number is one greater than the beginning of the number concerned.)

The position number is in mixed base $0*50+4*10+1*2+0*1=42$.

The third horizontal bit sequence in the y-code thus belongs to the 43rd code window which has a start position 0 or 1, and as there are four rows in total for each such code window, the third row is number $43*4=172$.

In this example, the position of the top left corner of the partial surface with 4*4 marks is (58, 170).

As the vertical bit sequences in the x-code in the 4*4 group start at row 170, the whole pattern's x-columns start in the positions of the number series ((2 0 4 6)−169) modulo 7=1 6 3 5. Between the last start position (5) and the first start position the numbers 0-19 are coded in the mixed base, and by adding the representations of the numbers 0-19 in the mixed base the total difference between these columns is obtained. A naive algorithm for doing this is to generate these twenty numbers and directly add their digits. Call the sum obtained s. The page or writing surface is then given by (5-s) modulo7.

An alternative method for determining which bit is the least significant in a partial surface in order to be able to identify a code window in this way is as follows. The least significant bit (LSB) is defined as the digit which is the lowest in a partial surface's differences or row position number. In this way the reduction (redundancy) of the maximum useable number of coordinates is relatively small. For example, the first code windows in the x-direction in the example above can all have LSB=1 and other digits between 2 and 6, which gives 25 code windows, the next can have LSB=2 and other digits between 3 and 6, which gives 16 code windows, the next can have LSB=3 and other digits between 4 and 6, which gives 9 code windows, the next can have LSB=4 and other digits between 5 and 6, which gives 4 code windows, the next can have LSB=5 and other digits 6, which gives 1 code window, that is a total of 55 code windows, compared to 32 in the example above.

In the example above, an embodiment has been described where each code window is coded by 4*4 marks and a number series with 7 bits is used. This is of course only one example. Positions can be coded by more or fewer marks. There does not need to be the same number in both directions. The number series can be of different length and does not need to be binary, but can be based on a different base, for example hex code. Different number series can be used for coding in the x-direction and coding in the y-direction. The marks can represent different numbers of values.

In a practical example, a partial surface is used consisting of 6*6 marks and where the bit series as a maximum can consist of $2^6$ bits, that is 64 bits. However, a bit series consisting of 51 bits is used, and consequently 51 positions, in order to have the ability to determine the rotational position of the partial surface. An example of such a bit series is:

0 0 0 0 0 1 1 0 0 0 1 1 1 1 1 0 1 0 1 0 1 1 0 1 1 0 0 1 1
0 1 0 0 0 1 0 1 0 0 1 1 1 0 1 1 1 1 0 0 1 0

Such a partial surface consisting of six by six marks can theoretically code $4^{6*6}$ positions, which with the above-mentioned raster dimension of 0.3 mm is an extremely large surface.

In a similar way as described above for the seven-bit series, according to the present invention the characteristic is utilized that the partial surface is enlarged to include one bit on each side of the partial surface, at least at its center, so that for the third and fourth rows in the partial surface of 6*6 symbols, 8 symbols are read, one on each side of the partial surface, and similarly in the y-direction. The above-mentioned bit series which contains 51 bits has the characteristic that a bit sequence of 6 bits occurs only once and that a bit sequence of 8 bits which contains the above-mentioned bit sequence of 6 bits occurs only once and never in an inverted position or reversed and inverted. In this way, the rotational position of the partial surface can be determined by reading 8 bits in row 3, row 4, column 3 and/or column 4. When the rotational position is known, the partial surface can be rotated to the correct position before processing is continued.

It is desirable to obtain a pattern which is as random as possible, that is where areas with excessive symmetry do not occur. It is desirable to obtain a pattern where a partial surface with 6*6 marks contains marks with all the different positions in accordance with FIGS. 2a to 2d. In order to increase the randomness further or avoid repetitive characteristics, a method can be used which is called "shuffle". Each horizontal bit sequence starts in a predetermined start position. However, it is possible to displace the start position in the horizontal direction for each row, if the displacement is known. This can be carried out by each least significant bit (LSB) being allocated a separate displacement vector for the adjacent rows. The displacement vector states by how much each row is displaced in the horizontal direction. Visually it can be regarded as if the y-axis in FIG. 1 is "spiky".

In the example above, with a 4*4 code window, the displacement vector can be 1, 2, 4, 0 for LSB=0 and 2, 2, 3, 0 for LSB=1. This means that after subtracting the number 2 and 0 respectively, the above displacement is to be subtracted (modulo five) from the bit sequence's position number, before the processing continues. In the example above, for the y-coordinate the digits 4 1 0 0 ($S_2$, $S_1$, $S_0$, $S_4$) are obtained in the mixed base, where the second digit from the right is the least significant digit, LSB. As the displacement vector 1, 2, 4, 0 is to be used (LSB=0) for the digits 4 and 1, 2 is subtracted from 4 to give $S_2$=2 and 4 is subtracted from 1 (modulo five) to give $S_1$=2. The digit $S_0$=0 remains unchanged (the displacement vector's component for the least significant digit is always zero). Finally, the digit $S_4$ belongs to the next code window, which must have LSB=1, that is the second displacement vector is to be used. Thus 2 is subtracted from 0 (modulo five) which gives $S_4$=3.

A similar method can be used to change the codes for the x-coordinates. However, there is less need to change the x-coordinates, as they are already relatively randomly distributed, as the difference zero is not used, in the example above.

In the example above, the mark is a dot. Naturally it can have a different appearance. It can, for example, consist of a line or an ellipse, which starts at the virtual raster point and extends from this to a particular position. Other symbols than a dot can be used, such as a square, rectangle, triangle, circle or ellipse, filled-in or not.

In the example above, the marks are used within a square partial surface for coding a position. The partial surface can be another shape, for example hexagonal. The marks do not need to be arranged along the raster lines in an orthogonal raster but can also be arranged in other manners, such as along the raster lines in a raster with 60 degree angles, etc. A polar coordinate system can also be used.

Figure 5:
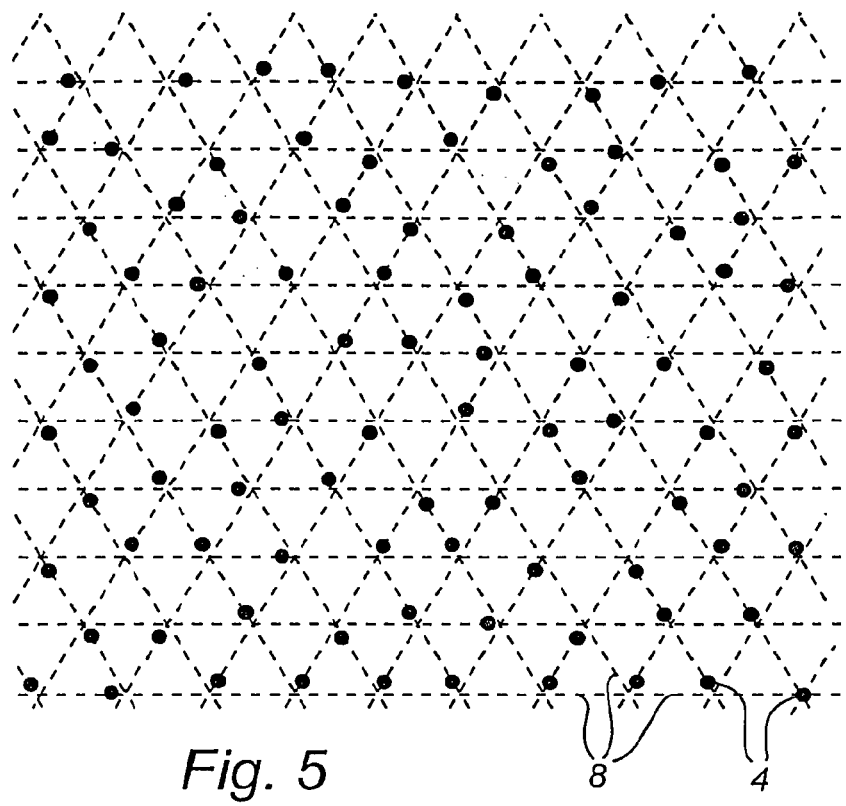
FIG. 5 shows schematically a position-coding pattern with triangular raster.
Figure 6:
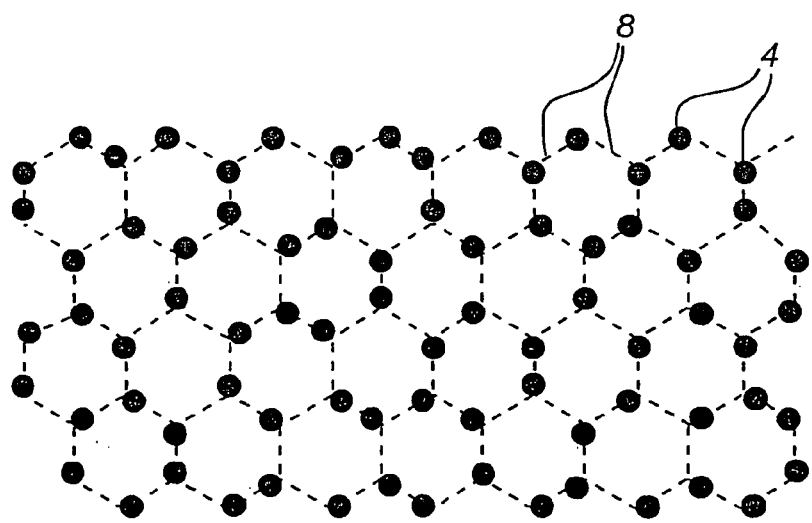
FIG. 6 shows schematically a position-coding pattern with hexagonal raster.

Rasters in the form of triangles or hexagons can also be used, as shown in FIGS. 5 and 6. For example, a raster with triangles, see FIG. 5, enables each mark to be displaced in six different directions, which provides even greater possibilities, corresponding to $6_{6*6}$ partial surface positions. For a hexagonal raster, FIG. 6, a honeycomb pattern, each mark can be displaced in three different directions along the raster lines.

As mentioned above, the marks do not need to be displaced along the raster lines but can be displaced in other directions, for example in order to be located each in a separate quadrant when using a square raster pattern. In the hexagonal raster pattern the marks can be displaced in four or more different directions, for example in six different directions along the raster lines and along lines which are at 60 degrees to the raster lines.

In order for the position code to be able to be detected, it is necessary for the virtual raster to be determined. This can be carried out, in a square raster pattern, by examining the distance between different marks. The shortest distance between two marks must originate from two adjacent marks with the values 1 and 3 in the horizontal direction or 2 and 4 in the vertical direction, so that the marks lie on the same raster line between two raster points. When such a pair of marks has been detected, the associated raster points (the nominal positions) can be determined using knowledge of the distance between the raster points and the displacement of the marks from the raster points. Once two raster points have been located, additional raster points can be determined using the measured distance to other marks and from knowledge of the distance between the raster points.

If the marks are displaced 50 µm along the raster lines, which are a distance of 300 µm apart, the least distance between two marks will be 200 µm, for example between marks with the values 1 and 3. The next smallest distance arises between, for example, marks with the values 1 and 2, and is 255 µm. There is therefore a relatively distinct difference between the least and the next smallest distance. The difference to any diagonals is also great. However, if the displacement is larger than 50 µm, for example more than 75 µm (¼), diagonals can cause problems and it can be difficult to determine to which nominal position a mark belongs. If the displacement is less than 50 µm, for example less than approximately 35 µm (⅛), the least distance will be 230 µm, which does not give a very large difference to the next distance, which is then 267 µm. In addition, the demands on the optical reading increase.

The marks should not cover their own raster point and should therefore not have a larger diameter than twice the displacement, that is 200%. This is, however, not critical, and a certain overlapping can be permitted, for example 240%. The least size is determined in the first place by the resolution of the sensor and the demands of the printing process used to produce the pattern. However, the marks should not have a smaller diameter than approximately 50% of the displacement in practice, in order to avoid problems with particles and noise in the sensor.

Figure 7:
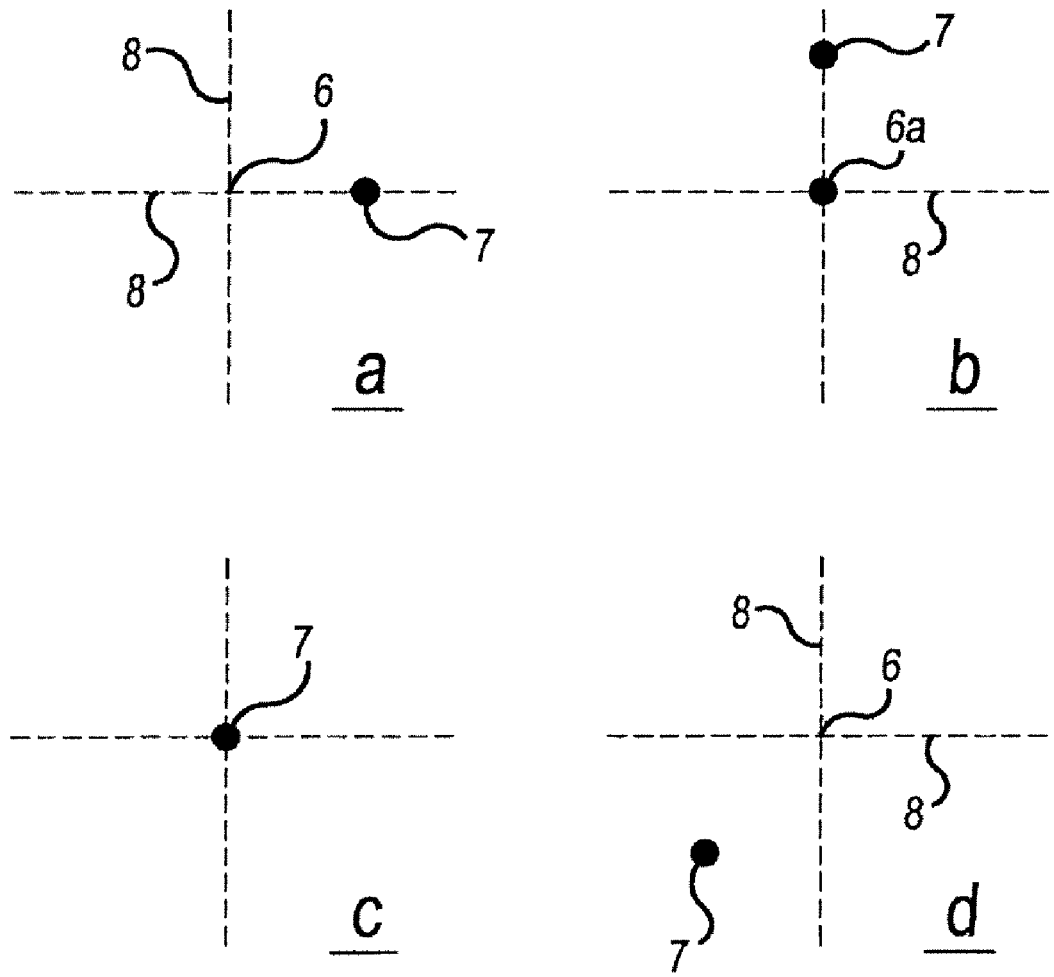
FIG. 7 including

FIGS. 7(a) to 7(c) illustrate alternative mark positions described in the present application. FIG. 7(a) illustrates the disclosed embodiment where a mark 7 typically used for information encoding is displaced in a direction along a raster line 8 from a nominal position 6. FIG. 7(b) illustrates an embodiment described above, where in addition to a mark 7 used for information encoding, the pattern includes, at least some nominal positions, a nominal position identifying mark 6a, in this example provided at the nominal point 6. FIG. 7(c) illustrates other embodiments, for example the embodiment described above where the mark 7 normally used for information encoding is positioned at the nominal position 6 in order to, for example, represent a specific parameter or, in an embodiment described above, where a logical zero as compared to a logical one is positioned as mark 7 at the nominal position 6 as illustrated for example in FIG. 7(a). FIG. 7(d) illustrates the embodiment described in the preceding paragraph.

Figure 4:
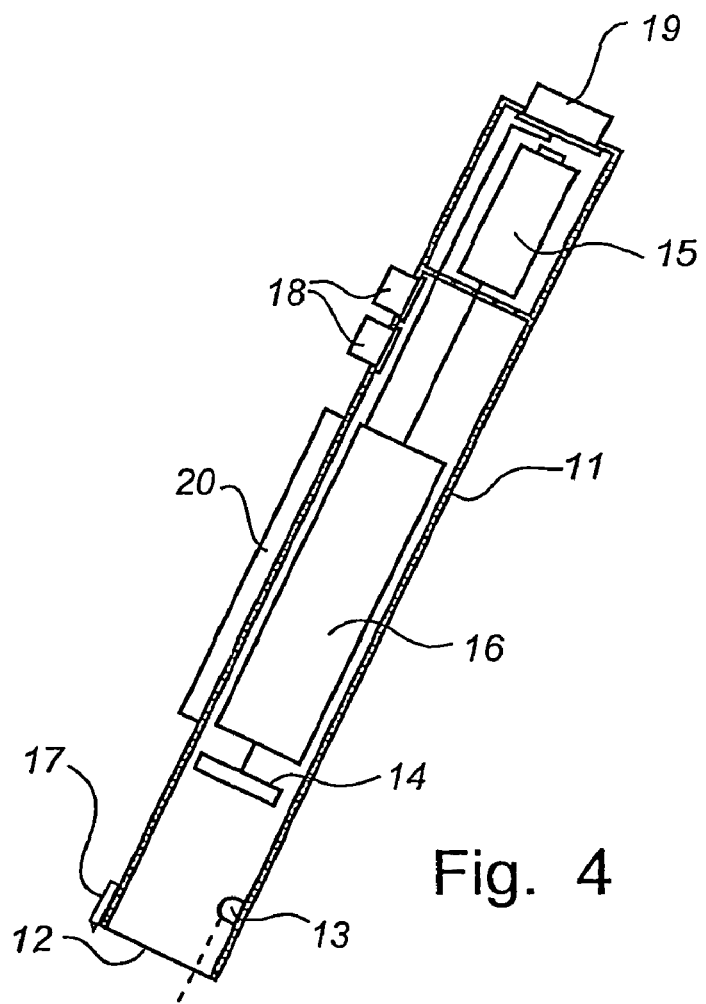
FIG. 4 shows schematically a device which can be used for position determination.

An embodiment of a device for position determination is shown schematically in FIG. 4. It comprises a casing 11 which has approximately the same shape as a pen. In the short side of the casing there is an opening 12. The short side is intended to abut against or to be held a short distance from the surface on which the position determination is to be carried out.

The casing contains essentially an optics part, an electronic circuitry part and a power supply.

The optics part comprises at least one light-emitting diode 13 for illuminating the surface which is to be imaged and a light-sensitive area sensor 14, for example a CCD or CMOS sensor, for recording a two-dimensional image. If required, the device can also contain an optical system, such as a mirror and/or lens system. The light-emitting diode can be an infra-red light-emitting diode and the sensor can be sensitive to infrared light.

The power supply for the device is obtained from a battery 15, which is mounted in a separate compartment in the casing.

The electronic circuitry part contains image-processing means 16 for determining a position on the basis of the image recorded by the sensor 14 and in particular a processor unit with a processor which is programmed to read images from the sensor and carry out position determination on the basis of these images.

In this embodiment, the device also comprises a pen point 17, with the aid of which ordinary pigment-based writing can be written on the surface on which the position determination is to be carried out. The pen point 17 is extendable and retractable so that the user can control whether or not it is to be used. In certain applications the device does not need to have a pen point at all.

The pigment-based writing is suitably of a type that is transparent to infrared light and the marks suitably absorb infrared light. By using a light-emitting diode which emits infrared light and a sensor which is sensitive to infrared light, the detection of the pattern can be carried out without the above-mentioned writing interfering with the pattern.

The device also comprises buttons 18, by means of which the device can be activated and controlled. It has also a transceiver 19 for wireless transmission, for example using infra-red light, radio waves or ultrasound, of information to and from the device. The device can also comprise a display 20 for displaying positions or recorded information.

A device for recording text is described in Applicant's Swedish Patent No. 9604008-4. This device can be used for position determination if it is programmed in a suitable way. If it is to be used for pigment-based writing, then it must also be given a pen point.

The device can be divided between different physical casings, a first casing containing components which are required for recording images of the position-coding pattern and for transmitting these to components which are contained in a second casing and which carry out the position determination on the basis of the recorded image (s).

As mentioned, the position determination is carried out by a processor which thus must have software for locating marks in an image and decoding them and for determining positions from the codes thus obtained. A person skilled in the art will be able, based on the example above, to design software which carries out position determination on the basis of an image of a part of a position-coding pattern.

In addition, on the basis of the description above, a person skilled in the art will be able to design software for printing out the position-coding pattern.

In the embodiment above, the pattern is optically readable and the sensor is therefore optical. As mentioned, the pattern can be based on a parameter other than an optical parameter. In such a case the sensor must of course be of a type which can read the parameter concerned. Examples of such parameters are chemical, acoustic or electromagnetic marks. Capacitive or inductive marks can also be used.

In the embodiment above, the raster is an orthogonal grid. It can also have other forms, such as a rhombic grid, for example with 60 degree angles, a triangular or hexagonal grid, etc.

Displacement in more or less than four directions can be used; for example displacement in three directions along a hexagonal virtual raster. In an orthogonal raster only two displacements can be used, in order to facilitate the recreation of the raster. However, a displacement in four directions is preferred, but six or eight directions are also possible within the scope of the invention.

In the embodiment above, the longest possible cyclic number series is not used. As a result, a degree of redundancy is obtained which can be used in various ways, for example to carry out error correcting, replace missing or hidden marks, etc.

What is claimed is:

1. A product for decoding information, the product comprising:
    a sensor for detecting a plurality of marks on a surface to obtain associated mark location data, at least a first group of the plurality of marks being arranged on the surface so as to define an invisible raster with predetermined dimensions, and wherein marks in at least a second group of the plurality of marks are displaced from raster locations in a manner encoding information; and
    a processor for receiving from the sensor at least some of the mark location data, the processor being configured to determine, using the received mark location data, a position of the invisible raster on the surface, and the processor being further configured to decode information based on positions of at least some of the marks in the second group of the plurality of marks relative to locations on the invisible raster.

2. The product of claim 1, wherein the raster is rendered invisible by virtue of an absence of printed raster lines.

3. The product of claim 1, wherein the raster is rendered invisible by virtue of an absence of marks at a plurality of raster intersection points.

4. The product of claim 1, wherein the first group of the plurality of marks and the second group of the plurality of marks constitute a same group of marks in the plurality of marks.

5. The product of claim 1, wherein each mark of the plurality of marks is displaced from a raster location in a manner encoding information.

6. The product of claim 1, wherein raster locations are nominal points, and wherein the processor is configured to decode information based on the position of at least some of the marks in the second group of the plurality of marks relative to nominal points on the invisible raster.

7. The product of claim 1, wherein each raster location is associated with a same number of displaced marks.

8. The product of claim 1, wherein the received mark location data reflects relative positions of at least some of the first group of the plurality of marks, and wherein the position of the invisible raster on the surface is determined by the processor based on the relative positions of the at least some of the first group of the plurality of marks.

9. The product of claim 1, wherein the plurality of marks are constructed to be minimally perceptible to the human eye.

10. The product of claim 1, wherein each of the plurality of marks is substantially identical.

11. The product of claim 1, wherein each of the plurality of marks is rotationally invariant.

12. The product of claim 1, wherein each of the plurality of marks is substantially the same size.

13. The product of claim 1, wherein each of the plurality of marks is circular in shape.

14. A method for decoding information, the method comprising:
receiving, by a processor, mark location data from a sensor, the mark location data indicative of locations of at least some of a plurality of marks on a surface, a first group of the plurality of marks being arranged on the surface so as to define an invisible raster with predetermined dimensions, and wherein marks in a second group of the plurality of marks are displaced from raster locations in a manner encoding information;
determining, by the processor, a position of the invisible raster on the surface using the received mark location data; and
decoding information based on positions of at least some of the marks in the second group of the plurality of marks relative to locations on the invisible raster.

15. The method of claim 14, wherein the raster is rendered invisible by virtue of an absence of printed raster lines.

16. The method of claim 14, wherein the raster is rendered invisible by virtue of an absence of marks at a plurality of raster intersection points.

17. The method of claim 14, wherein the first group of the plurality of marks and the second group of the plurality of marks constitute a same group of marks in the plurality of marks.

18. The method of claim 14, wherein each mark of the plurality of marks is displaced from a raster location in a manner encoding information.

19. The method of claim 14, further comprising detecting a plurality of marks on the surface to obtain the mark location data using the sensor.

20. The method of claim 14, wherein the raster locations are nominal points, and wherein the decoding is based on the position of at least some of the marks in the second group of the plurality of marks relative to nominal points on the invisible raster.

21. The method of claim 14, wherein each raster location is associated with a same number of displaced marks.

22. The method of claim 14, wherein the received mark location data reflects relative positions of at least some of the first group of the plurality of marks, and wherein the determining of the position of the invisible raster on the surface is based on the relative positions of the at least some of the first group of the plurality of marks.

23. The method of claim 14, wherein the plurality of marks are constructed to be minimally perceptible to the human eye.

24. The method of claim 14, wherein each of the plurality of marks is substantially identical.

25. The method of claim 14, wherein each of the plurality of marks is rotationally invariant.

26. The method of claim 14, wherein each of the plurality of marks is substantially the same size.

27. The method of claim 14, wherein each of the plurality of marks is circular in shape.

28. A computer-readable medium encoded with instructions which, when executed in a processor, perform a method for decoding information, the method comprising:
receiving, by a processor, mark location data from a sensor, the mark location data indicative of locations of at least some of a plurality of marks on a surface, a first group of the plurality of marks being arranged on the surface so as to define an invisible raster with predetermined dimensions, and wherein marks in a second group of the plurality of marks are displaced from raster locations in a manner encoding information;
determining, by the processor, a position of the invisible raster on the surface using the received mark location data; and
decoding information based on positions of at least some of the marks in the second group of the plurality of marks relative to locations on the invisible raster.

29. The computer-readable medium of claim 28, wherein the raster is rendered invisible by virtue of an absence of printed raster lines.

30. The computer-readable medium of claim 28, wherein the raster is rendered invisible by virtue of an absence of marks at a plurality of raster intersection points.

31. The computer-readable medium of claim 28, wherein the first group of the plurality of marks and the second group of the plurality of marks constitute a same group of marks in the plurality of marks.

32. The computer-readable medium of claim 28, wherein each mark of the plurality of marks is displaced from a raster location in a manner encoding information.

33. The computer-readable medium of claim 28, the method further comprising detecting a plurality of marks on the surface to obtain the mark location data using the sensor.

34. The computer-readable medium of claim 28, wherein the raster locations are nominal points, and wherein the decoding is based on the position of at least some of the marks in the second group of the plurality of marks relative to nominal points on the invisible raster.

35. The computer-readable medium of claim 28, wherein each raster location is associated with a same number of displaced marks.

36. The computer-readable medium of claim 28, wherein the received mark location data reflects relative positions of at least some of the first group of the plurality of marks, and wherein the determining of the position of the invisible raster on the surface is based on the relative positions of the at least some of the first group of the plurality of marks.

37. The computer-readable medium of claim 28, wherein the plurality of marks are constructed to be minimally perceptible to the human eye.

38. The computer-readable medium of claim 28, wherein each of the plurality of marks is substantially identical.

39. The computer-readable medium of claim 28, wherein each of the plurality of marks is rotationally invariant.

40. The computer-readable medium of claim 28, wherein each of the plurality of marks is substantially the same size.

41. The computer-readable medium of claim 28, wherein each of the plurality of marks is circular in shape.

42. A product for decoding information, the product comprising:
a sensor for detecting a plurality of marks on a surface to obtain associated mark location data, the plurality of marks being arranged on the surface so as to define an invisible raster with predetermined dimensions, wherein each mark is displaced from a raster location in a manner encoding information; and
a processor for receiving from the sensor mark location data indicative of locations of at least a subset of the marks on the surface, the processor being configured to determine, using the received mark location data, a position of the invisible raster on the surface, and the processor being further configured to decode information based on a position of at least some of the plurality of marks relative to locations on the invisible raster.

* * * * *